United States Patent [19]

Irvin et al.

[11] 4,121,029

[45] Oct. 17, 1978

[54] POLYOLEFIN REACTOR SYSTEM

[75] Inventors: Howard B. Irvin; Fred T. Sherk, both of Bartlesville, Okla.

[73] Assignee: Phillips Petroleum Company, Bartlesville, Okla.

[21] Appl. No.: 748,086

[22] Filed: Dec. 6, 1976

[51] Int. Cl.² .............................................. C08F 10/06
[52] U.S. Cl. ...................................... 526/64; 422/132; 526/68; 528/498
[58] Field of Search ..................... 526/64, 68; 528/498; 23/270 R, 288 R

[56] References Cited

U.S. PATENT DOCUMENTS

| 3,203,766 | 8/1965 | Mudd et al. | 526/64 |
| 3,242,150 | 3/1966 | Scoggin | 526/64 |
| 3,257,363 | 6/1966 | Miller et al. | 526/64 |
| 3,259,614 | 7/1966 | Pollock | 526/68 |
| 3,262,922 | 7/1966 | Payne | 526/64 |
| 3,293,000 | 12/1966 | Marwil | 526/64 |
| 3,318,857 | 5/1967 | Dietz | 526/64 |
| 3,324,093 | 6/1967 | Alleman | 526/64 |
| 3,374,211 | 3/1968 | Marwil et al. | 526/64 |
| 3,405,109 | 10/1968 | Rohlfing | 526/64 |

Primary Examiner—Alan Holler

[57] ABSTRACT

A method and apparatus are provided in a pipeloop reactor system for recovery of soluble catalyst components from polymer slurry effluent into the pipe-loop reactor. The polymer slurry is collected in a wash column attached to the upper run of the loop reactor; the slurry is allowed to settle through a countercurrent flow of wash liquid, the liquid used for wash, being one in which catalyst components are soluble; the washed slurry is collected in a settling leg attached to the wash column; and wash liquid containing catalyst components is overflowed into the reactor loop. In peferred embodiments of the invention the wash liquid is subjected to auto-refrigeration before being admitted into the wash column. In another preferred embodiment unreacted monomer feed is recovered from the polymer slurry, purified, and recycled as wash liquid. In still another embodiment of the invention the flow of polymer from the reactor loop into the wash column is mechanically restricted.

8 Claims, 1 Drawing Figure

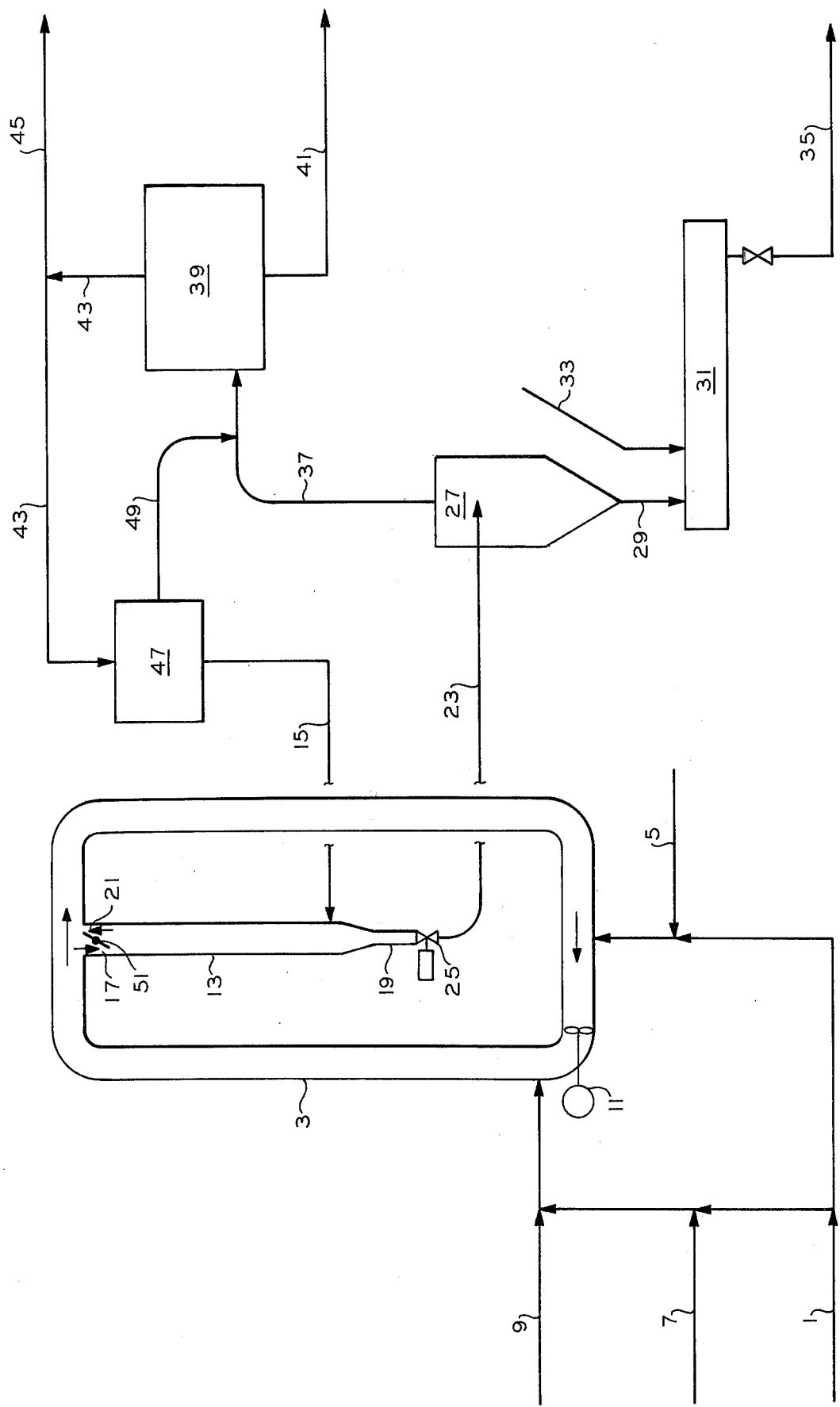

POLYOLEFIN REACTOR SYSTEM

BACKGROUND OF THE INVENTION

This invention relates to systems for producing polyolefins. In one of its aspects this invention relates to the production of olefin polymers using a loop reactor. In another of its aspects this invention relates to the recovery of soluble catalyst components from effluent polymer slurry. In another of its aspects this invention relates to integrating a wash column apparatus and polymer slurry settling leg into a pipe-loop reactor system. In yet another aspect of the invention it relates to an integrated system for recovery of unreacted monomer from polymer slurry effluent with purification of the recovered monomer and recycle of the purified monomer to a wash column attached to the reactor loop in a pipe-loop reactor system.

The use of pipe-loop reactor systems in the polymerization of olefin monomer is well known in the art. High productivity catalysts that produce low levels of soluble polymers have recently been developed for use in pipe-loop reactors. Using these catalyst systems, it has been discovered that a wash column with settling leg can be attached directly to a pipe-loop reactor thereby eliminating conventional contactors and wash column generally associated with such a system. This combination of equipment permits both a reduction of overall equipment investment and an improvement in efficiency in recovery of catalyst components for effective use in the polymerization system thereby improving the economics of using the catalyst system.

It is therefore an object of this invention to provide a pipe-loop reactor equipped with an attached wash column and settling leg. It is another object of this invention to provide an apparatus for controlling flow of settling polymer into the wash column. It is another object of this invention to provide a method for recovering soluble catalyst from the effluent polymer slurry of a pipe-loop reactor back into the reactor. It is still another object of this invention to provide an integrated system for recovery of propylene monomer from the reactor effluent in a propylene polymerization with recycle of at least a portion of the propylene monomer as wash liquid in a wash column attached to a pipe-loop reactor.

Other aspects, objects, and the various advantages of this invention will become apparent upon study of this specification, the drawings, and the attached claims.

STATEMENT OF THE INVENTION

According to this invention, in a pipe-loop reactor system, apparatus is provided comprising a wash column with appended settling leg attached to the upper run of the reactor with the wash column provided with means for admitting wash liquid into the column above the settling leg.

In another embodiment of the invention a pipe-loop reactor system is further provided with means for removing polymer slurry as effluent from the settling leg, means for recovering umpolymerized monomer from this effluent, means for purifying the monomer recovered from the effluent, and means for recycling the purified, recovered monomer to the wash column as wash liquid. The recovery and recycle system can advantageously contain a means for autorefrigeration of the purified monomer so that cooled, purified monomer is recycled to the wash column.

By the process of this invention a method is provided for recovering soluble catalyst components from the reactor slurry effluent back into a pipe-loop reactor. In this method polymer slurry is allowed to collect into a wash column attached to the upper run of a pipe-loop reactor, the slurry settles through a countercurrent flow of wash liquid in which catalyst components are soluble, the washed slurry is collected and a settling leg attached to the wash column below the entrance for the wash liquid, and the wash liquid containing dissolved catalyst components is overflowed into the reactor loop. The washed slurry can be further treated by removal from the settling leg, recovery of unpolymerized monomer from the slurry, and purification and recycling of this monomer to the wash column as wash liquid, thereby providing an integrated system of improved overall monomer efficiency.

Although the apparatus and method of this invention are suitable for use in a wide variety of polymerization systems the invention is most applicable to olefin polymerization, particularly the polymerization of monoolefin having from about 2 to about 8 carbon atoms per molecule. The invention is particularly suitable in a process for the polymerization of propylene using high productivity catalysts which are soluble in the propylene monomer. Such catalysts usually contain an alkyl aluminum such as the catalyst systems set out in U.S. Pat. No. 3,219,647 and German Pat. No. 2,347,577.

The invention will be described in conjunction with the drawing which shows schematically a propylene polymerization reactor and recovery system. The description will detail a preferred embodiment in which propylene monomer is polymerized using a high productivity catalyst with recovery of unpolymerized monomer from the polymerization slurry effluent, with purification and recycling of the recovered monomer as wash liquid in a wash column attached to the pipe-loop reactor.

Referring now to the drawing, propylene monomer is fed through line 1 to join with the catalyst components in catalyst adjuvant to be fed into pipe-loop reactor 3. As illustrated, the propylene is divided so that about 20 percent is used to flush the solid catalyst component entering through line 5 into the reactor and the remaining 80 percent is contacted with the liquid catalyst component entering through line 7, an adjuvant entering through line 9 so that the propylene monomer is scavenged for catalyst poisons before entry into the reactor 3. Methods other than that illustrated for the scavenging of poisons are known in the art so that the total propylene feed stream can be passed through a scavenging operation before entry into the reactor.

The reactor 3 is a typical pipe-loop reaction system as described in U.S. Pat. No. 3,318,857. The reactor loop is equipped with means 11 for circulating the liquid in the loop 3 and attached to the upper run of the reactor is a wash column 13 which is an elongated pipe section depending from the upper run of the reactor. The wash column has near its lower end an entry line for wash liquid 15 so that representative slurry 17 from the pipe-loop reactor drops into the top of the wash column 13 and is contacted with the wash liquid as the propylene polymer particles move down the wash column toward the settling leg 19 and the liquid propylene phase 21 is displaced into the upper loop by the recycled propylene flowing into the wash column through line 15. In the high productivity catalyst system preferred for this invention the soluble portion of the catalyst and adjuvant — mainly triethylaluminum and ethylbenzoate, respectively — are washed back into the loop reactor with only a relatively small amount escaping with the polymer settling into the settling leg 19.

From the settling leg 19 a controlled flow of propylene polymer fluff is removed through line 23. The effluent slurry from the settling leg is flash evaporated by reduction of pressure on leaving the settling leg to produce a propylene polymer fluff in the flash tank that after adding oxidation inhibitors, neutralizers, and other additives dependent on product application, can be dried, purged, and finished without further treatment. In the drawing these treatments are represented by flashing the slurry into line 23 through control valve 25 and into flash tank 27 from which propylene polymer fluff is removed through line 29 and drier 31 into which appropriate stabilizers are added for treating the fluff through line 33 and the polymer fluff is discharged through line 35 for storage or for further treatment.

Although there will be a moderate buildup of soluble propylene polymer in the loop reactor, the amount of soluble propylene polymer in the stream exiting the bottom of the settling leg 19 can be maintained at a minimum by proper adjustment of the reaction controls in the loop reactor. Such control adjustment is not a part of this invention.

The washing action of the propylene used in the instance of this example as wash liquid reduces the catalyst residues, ash producing material, in the propylene polymer effluent from the wash column 13 sufficiently to preclude the necessity of further purification of the polymer fluff.

The recycle propylene used as wash liquid is produced by treating the vapor from the flashing of the effluent from the settling leg 19: passing the flashed vapor through line 37 into a propylene recovery and purification system 39 which is preferably a fractionation, removing propylene heavies through line 41 and returning a propylene recycle through line 43 which, after removal of a small purge stream of rejected propylene containing propane through line 45, is passed through a refrigeration system 47 for cooling of the recycled propylene to prevent thermal inversion in the wash tower and is passed through line 15 into the base of the wash tower 13. The refrigeration unit is preferably an autorefrigeration system such as is well known in U.S. Pat. No. 3,246,479. The use of refrigeration system 47 is optional, depending upon the operating temperature of the reactor, since a temperature differential between the reactor effluent and the washed propylene of about 50° is sufficient to achieve adequate washing. Vapor flashed from the autorefrigeration unit is returned through line 49 to join with the flashed vapor in line 37 so that it can be condensed in purification system 39.

In an embodiment of the invention an adjustable damper 51 is installed at the top of wash tower 13. The damper can be regulated to restrict the flow rate of slurry into the wash column thereby holding the slurry concentration in the loop reactor 3 at a desired level. Although control of the slurry concentration can be maintained by adjustment of the reactor conditions, damper 51 provides an additional mechanical means for control of concentration. The damper can be controlled manually or automatically in response to changing concentration of slurry in the reactor.

In the following table respresentative concentrations of the major components of selected streams within the process are provided. Values in the following table are typical for a process using a reactor having an internal diameter of 20 inches (51 cm) and a loop length of 250 feet (76 meters), a wash column having a 4 foot (1.2 meter) diameter and length of 50 feet (15.3 meters), and a settling leg having a diameter of 22 inches (56 cm) and a length of 10 feet (3.1 meters). The reaction takes place at a temperature of about 140° F (60° C) and a pressure of about 500 psia (3.45 mPa). The wash propylene enters the wash column at a temperature of about 90° F (32° C). About 10,000 pounds per hour (4540 kg/hr) of polymer are produced with a slurry of about 50 weight percent polymer.

TABLE

| STREAM NO. | 1 | 15 | 45 | 41 | 35 | 17 | 21 | 19 | 37 |
|---|---|---|---|---|---|---|---|---|---|
| Description | Fresh Propylene | Recycle Propylene | Reject Propylene | Heavies | Poly-Propylene Fluff | Slurry In Loop Reactor | Liquid From Wash Column | Settled Slurry To Flash Tank | Propylene Vapor From Flash |
| Weight ratio[1] | | | | | | | | | |
| Propylene | 100 | 63.3 | 2 | | | 127.4 | 125.4 | 65.3 | 65.3 |
| Propane | 1 | 31.7 | 1 | | | 19.6 | 18.6 | 32.7 | 32.7 |
| Polypropylene | | | | 1 | 97 | 98.0 | | 98.0 | 1.0 |
| TOTAL | 101 | 95.0 | 3 | 1 | 97 | 245.0 | 144.0 | 196.0 | 99.0 |
| Weight Percent | | | | | | | | | |
| Propylene | 99.0 | 66.7 | 67 | | | 52.0 | 87.1 | 33.3 | 66.0 |
| Propane | 1.0 | 33.3 | 33 | | | 8.0 | 12.9 | 16.7 | 33.0 |
| Polypropylene | | | | 100 | 100 | 40.0 | | 50.0 | 1.0 |

Based on 100 pounds propylene charged

Use of the proposed method and apparatus of this invention will result in reduced chemical cost as compared to systems without the attached wash column and recycle systems because of the net use of less soluble catalyst and adjuvant and the elimination of catalyst removal chemicals such as propylene oxide and acetylene acetone currently in use in propylene polymerization systems. Contacting equipment, large wash towers, and the use of large amounts of wash propylene currently necessary in propylene polymerization systems can be eliminated. The elimination of wash propylene as a separately cycled system and the fact that a thickened slurry effluent is removed from this system rather than representative slurry are removed from the present system can result in the requirement of a propylene fractionator that has a throughput of only about 1/7 of that necessary in current commercial operation.

I claim:

1. In a pipe-loop reactor system, apparatus comprising
   (1) a wash column attached to the upper run of the reactor with means at the juncture of the wash column and of the pipe-loop reactor for restricting flow from the loop into the wash column,
   (2) an appended settling leg attached to the wash column, said wash column provided with means for admitting purified monomer wash liquid into the base of the column above the settling leg, and (3) means for removing polymer slurry from said settling leg.

2. A reactor system of claim 1 further comprising operably connected to said means for removing:

(4) means for recovering unpolymerized monomer, said means for recovering connected operably to (5) means for purifying the recovered monomer, and (6) means for recycling the purified monomer to the wash column as wash liquid.

3. A system of claim 1 wherein said means for restricting flow is a damper.

4. In a pipe-loop reactor system of claim 2 means for autorefrigeration of the purified monomer before recycle of said purified monomer to the wash column.

5. A method for recovering soluble catalyst components into a pipe-loop reactor, said method comprising:

(1) restricting at the juncture of the wash column and of the pipe-loop reactor the collecting of polymer slurry into a wash column attached to the upper run of the reactor, (2) allowing said slurry admitted to the wash column to settle through a countercurrent flow of wash liquid in which catalyst components are soluble, (3) collecting washed slurry in a settling leg attached to the wash column, (4) overflowing wash liquid containing catalyst components from the wash column into the reactor loop, and (5) removing slurry from the settling leg.

6. A method of claim 5 wherein the polymer is a propylene polymer.

7. A method of claim 6 wherein the monomer is propylene.

8. A method of claim 5 further comprising:

(6) recovering unpolymerized monomer from the slurry, (7) purifying the monomer, and (8) recycling the purified monomer to the wash column as wash liquid.

* * * * *